United States Patent
Brochu et al.

(10) Patent No.: US 7,273,330 B1
(45) Date of Patent: Sep. 25, 2007

(54) INVERT ELEVATION-CHANGE ADAPTER

(75) Inventors: Ronald P. Brochu, Richmond, KY (US); James J. Burnes, Deep River, CT (US)

(73) Assignee: Infiltrator Systems, Inc., Old Saybrook, CT (US)

(*) Notice: Subject to any disclaimer, the term of this patent is extended or adjusted under 35 U.S.C. 154(b) by 0 days.

(21) Appl. No.: 11/280,705

(22) Filed: Nov. 16, 2005

(51) Int. Cl.
*E02B 11/00* (2006.01)
*E02B 13/00* (2006.01)

(52) U.S. Cl. .................. 405/43; 405/44; 405/45; 405/46; 405/49

(58) Field of Classification Search ........... 405/43–46, 405/49
See application file for complete search history.

(56) References Cited

U.S. PATENT DOCUMENTS

| | | | |
|---|---|---|---|
| 5,017,041 A | 5/1991 | Nichols et al. | |
| 5,087,151 A * | 2/1992 | DiTullio | 405/43 |
| 5,556,231 A * | 9/1996 | Sidaway et al. | 405/48 |
| 5,839,844 A | 11/1998 | Nichols et al. | |
| 5,921,711 A * | 7/1999 | Sipaila | 405/45 |
| 6,602,023 B2 * | 8/2003 | Crescenzi et al. | 405/42 |
| 6,698,975 B1 * | 3/2004 | Benecke | 405/43 |
| 7,008,138 B2 * | 3/2006 | Burnes et al. | 405/46 |

* cited by examiner

*Primary Examiner*—Frederick L. Lagman
(74) *Attorney, Agent, or Firm*—C Nessler

(57) ABSTRACT

An adapter is used with a leaching chamber or like article to change the invert elevation for a pipe which carries water to the article. The first end of the adapter fits a hole or other port on the article. The body of the adapter rotates about that first end, changing the elevation of the second end relative to the base. Stops on the adapter body limit rotation: in one direction so the first and second ends are vertically aligned; and in the opposing direction so that the lengthwise axes of the first and second ends lie in an inclined plane. Thus, three positive invert elevations can be set for an inlet pipe for a particular article: a first and second at each limit of rotation of the adapter, and a third and lowermost elevation, wherein the adapter is not used.

17 Claims, 4 Drawing Sheets

INVERT ELEVATION-CHANGE ADAPTER

TECHNICAL FIELD

The present invention relates to leaching chambers, for dispersing wastewater or other liquids in permeable medium such as soil.

BACKGROUND

Leaching chambers of a type applicable to the present invention comprise molded thermoplastic articles having arch shape cross sections. Having open bottoms and perforated sidewalls, they are used for dispersing wastewater beneath the surface of the earth. See for instance U.S. Pat. Nos. 5,511,903, 5,401,116, and 4,759,661. As indicated in U.S. Pat. No. 5,017,041 and as well-known in commerce, wastewater or other water to be dispersed in medium is flowed to a leaching chamber by means of piping. Most commonly, and of interest in this application, the water is flowed by gravity through a 2 to 4 inch diameter polyethylene pipe. The water typically enters the chamber through an endplate, also called an end cap, having a suitable size hole for the inflow pipe. The water then flows from the chamber downwardly and sideways, through the perforated sidewalls and into the surrounding medium. It is often a desire or regulatory requirement that the inflow pipe invert (i.e., the bottom of the pipe interior) at the point of chamber entry be at a certain elevation relative to the base of the chamber, to achieve most effectiveness for the perforated walls and to enable storage of a certain large water volume within the chamber.

A typical prior art endplate, made of blow molded polyethylene, is shown in FIGS. 7 and 11 of Nichols U.S. Pat. No. 5,017,041. The cutout at the top of the endplate cooperates with the subarch at the top of the chamber, to provide high invert elevation. Some prior art endplates have molded circular grooves, so the installer can select the elevation and diameter for pipe entry. But the upper height limit is determined by the size of the end plate.

Sometimes the invert elevation which is needed, because of the particular chamber design or imposed installation criteria, is higher than that which allowed by use of a simple flat plate closure at the end of the chamber. That kind of need has been addressed in various ways in the prior art. One approach is shown in U.S. Pat. No. 5,839,844 of Nichols and Coppes, namely, a flat plate type end cap has a duct for receiving the inflow pipe. The duct is bent upwardly on a zigzag path, i.e., vertically and then horizontally. A disadvantage of the endplate with integral duct is that end caps having different inflow pipe invert elevations have to be made and stocked, since it is also a desire to raise the inlet pipe elevation as little as possible when that is needed, to help comply with requirements of minimum amounts of soil overlying the piping. And the bent duct approach can be infeasible when the end cap has a more complicated configuration, which provides the option of a variety of different connection points. See, for instance, the end cap of patent application Ser. No. 10/677,771 of Burnes et al., referred to below.

Another option for raising the invert level, used in the past, involves one or more pipe fittings, e.g., elbows and couplings. Typically, an inflow pipe stub runs at an upward incline angle from the hole in the article and is connected with the rest of the inflow piping by means of an elbow, such as a 22.5 degree elbow. While effective, cutting and fitting of the piping in the field is needed. Sometimes the environment is difficult; and there are labor cost increases.

Thus, there is a need for improvement in the way in which piping can be connected to leaching chambers and other articles, when the elevation of the inlet pipe invert dictated by the article design is too low.

SUMMARY

An object of the invention is to enable an installer to change the elevation at which an inflow pipe connects to the leaching chamber or other device. Another object is to provide an invert elevation change device having means for positively determining selected choices of elevation. A further object is to provide an elevation change device which is relatively simple to use and construct, and economic to make.

In accord with the invention, an adapter is provided for use with a subsurface leaching system article having a base and a water-entry port, typically a circular hole, at an elevation above the base; and the adapter comprises a first end, suited to connect to the water-entry port; and, an opposing second end shaped for receiving a water carrying pipe (which in absence of the adapter is connected to the article port.). A body with a hollow interior connects the ends. The ends have respective lengthwise axes which are spaced apart and parallel. The elevation of the second end of the adapter, and thus the invert elevation of the pipe, is changeable by rotation of the adapter about its first end which engages the article, In accord with an embodiment of the invention, when the first end of the adapter is inserted into the hole of the article, the body may be rotated about the axis of the first end. Means for limiting rotation in at least one direction, preferably both directions, are used. The adapter has a first limit position, determined by a built-in stop, where the axes of the opposing ends of the adapter are vertically aligned. At this position, the inlet end of the adapter is highest. The adapter has a second limit position, determined by a second built-in stop, at which point the axes are unaligned vertically; and elevation of the inlet end is lower than at the first stop-limit position, but it is still higher than the elevation of the first end, which is the elevation of the hole in the article with which the adapter is used.

In the preferred embodiment, use of the adapter provides the installer with a choice of three quickly selected water pipe invert elevations, by doing one of the following: (a) inserting the first end of the adapter in the hole and then rotating the body so the axes are vertically aligned, to obtain maximum invert elevation; or (b) inserting the first end of the adapter into the hole and rotating the body so said axes line in an incline plane, against a stop when that is provided, to obtain a second invert elevation which is less than said maximum but more than the elevation of the hole; or (c) removing the adapter, and connecting the pipe to the hole, to obtain a minimum invert elevation.

In an alternative embodiment, the body is not rotatable in the hole, and the different angular positions are determined by cooperating non-circular features, such as a spline, where the adapter engages the article.

In further accord with the invention, adapter embodiments have other features, which may be used independently, or in combination with the other features, including those mentioned just above. They include: at least one protuberance on the interior of the body near the second end, for limiting the extent to which a pipe is insertable into the second end; other protuberances on the exterior of the adapter first end for engaging portions of the article which surround the hole into which the adapter is inserted, to inhibit removal of the adapter from engagement with the article.

The adapter can be easily and economically made by injection molding. It provides a quick and positive way of changing invert elevation.

The foregoing and other objects, features and advantages of the present invention will become more apparent from the following description of preferred embodiments and accompanying drawings.

DESCRIPTION

Figure 1:
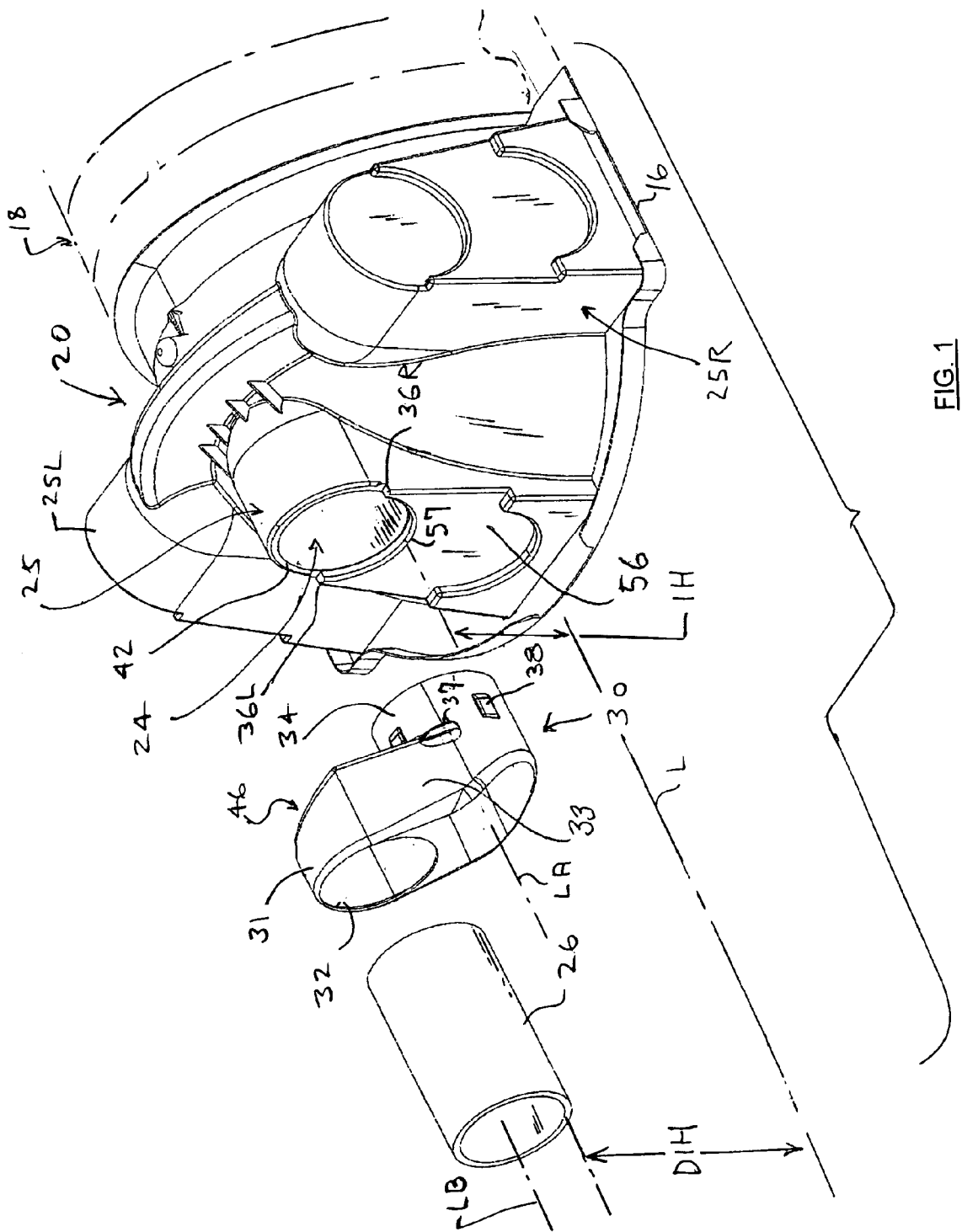
FIG. 1 is an isometric view of an exploded assembly comprised of an end cap connected to a chamber, shown in phantom, an adapter of the present invention, and inflow pipe.

FIG. 1 is an exploded assembly, comprising a leaching chamber end cap 20, adapter 30 and inflow pipe 26. The end cap, which is exemplary of the kind of device with which the adapter 30 of the present invention, is like that in co-pending patent application Ser. No. 10/677,771, filed on Oct. 1, 2003 by J. Burnes et al., the drawings and specification of which are hereby incorporated by reference End cap 20 closes off the end of phantom chamber 18 in FIG. 1. Chamber 18 might be about 34 inch wide at the base and about 13 inch in height.

End cap 20 has three orthogonally facing buttresses 25, 25L and 25R. A hole may be cut in the face 56 of a buttress to provide a port for water entry. The hole 24 is at an elevation above the base 16 of the end cap article. Optionally, holes may be cut in other buttresses 25L or 25R. Ordinarily, a plastic pipe is inserted in such hole to deliver wastewater to the end cap and associated chamber. The locations at which pipe holes may be cut in the buttresses may be defined by grooves which demark portions of plastic which can be cut or torn out. They are not shown here; see the aforementioned Burnes et al. application. In FIG. 1, the adapter is shown as it fits within hole 24, where the pipe would ordinarily go. A curved saddle 57 runs between ledges 56L and 56R on the face of buttress 25, and supports the base of the pipe or adapter which is inserted into the hole.

Figure 2:
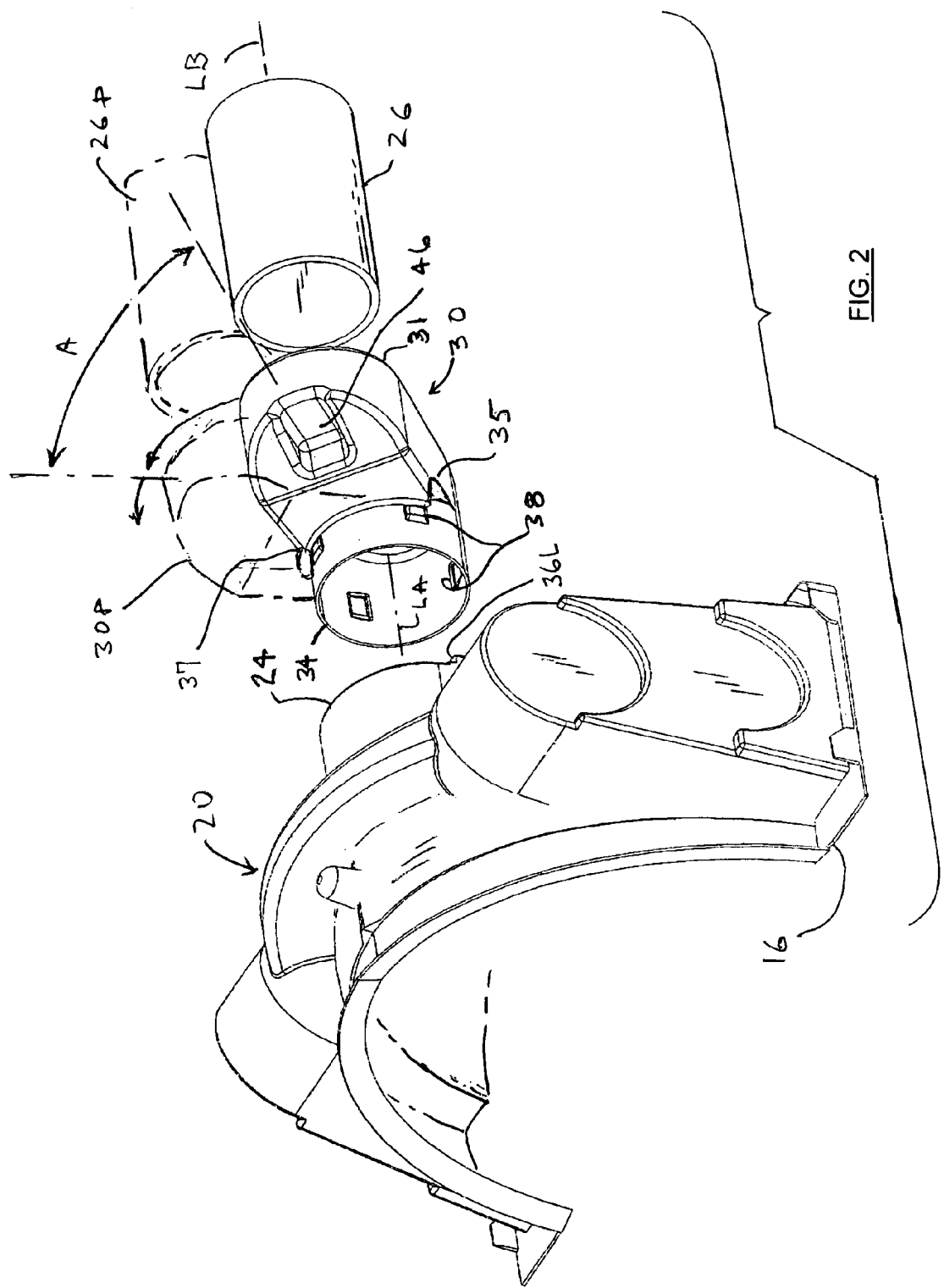
FIG. 2 is a view of the apparatus shown in FIG. 1 from the opposing axial direction, and shows how the adapter can rotate through a particular angle to change inflow pipe invert elevation.

In FIG. 1, hole 24 provides a port in the vertical face surface of the buttress 25. The buttress faces along the length axis L of the end cap, which axis corresponds with the length axis of the leaching chamber. FIG. 2 shows the assembly of FIG. 1 (less the phantom chamber) from the opposing length axis direction. FIG. 1 and FIG. 2 show how adapter 30, in side view, comprises a vaguely L shape hollow molded plastic body 33. Adapter 30 has a first male end 34 shaped like a short piece of pipe. The male end has a central or lengthwise axis LA running through the center of the opening. The adapter has a second female end 31, where there is an opening 32, having a central or lengthwise axis LB. Both axes LA and LB are called major axes. They are distinguished from any other axes, e.g., diametrical, which the ends may have. Preferably, opening 32 has a diameter which accepts a pipe having the same diameter as the male end which fits in hole 24. In use of the adapter, male end 34 slips into hole 24 of the end cap; and the male end may then be rotated within the opening 24. That rotation changes the angling of the adapter body and thus the invert elevation DIH of the female end 31 and any pipe 26 inserted in opening 32. At the highest DIH elevation, the axes are vertically aligned.

Figure 3:
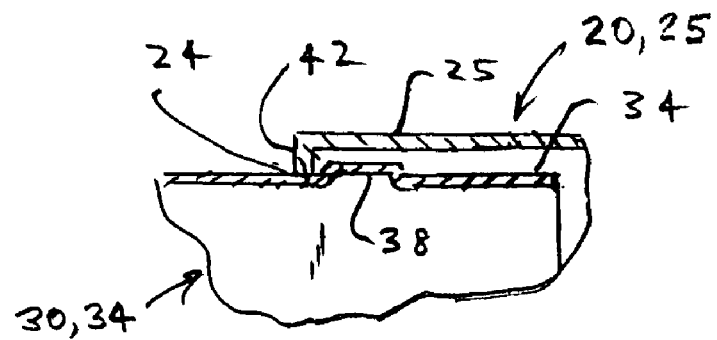
FIG. 3 is a partial vertical plane cross section, showing how the end of an adapter fits within a hole in a buttress of the end cap.

FIG. 3 is a portion of a vertical plane cross section vertical of adapter 30 inserted into the hole 24 of an end cap 20. The exterior surface of the adapter male end 34 has protruding dimples, tabs or the like, 38. See also FIG. 1. The protuberances 38 are shaped so that, when the adapter is pushed into the hole 24 of the end cap, they push aside the resilient plastic which defines the periphery of the hole. The plastic then springs back into position and engages the protuberances, thus providing resistance to withdrawal of the adapter from the hole. The inward motion of the adapter into hole 34 is limited by another feature, namely contact of either or both the body 33 and the molded ear 37 (described below) with the ledge(s) on the face of the buttress of the end cap. Multiple spaced apart protuberances are preferred but at least one can suffice.

Figure 4:
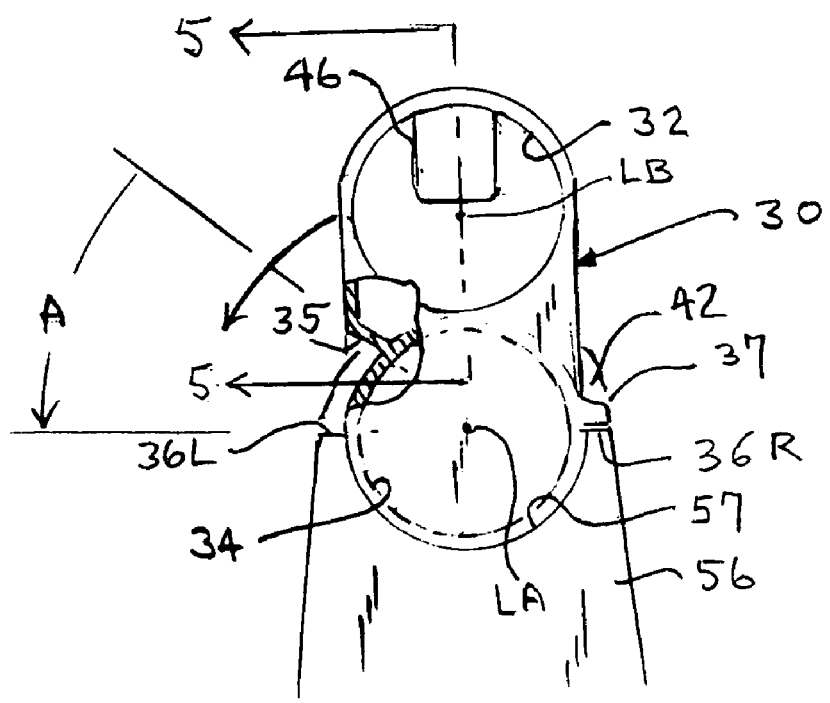
FIG. 4 is an axial end view of an adapter inserted into the hole of a buttress of a partially shown end cap, to illustrate stop features which limit rotation of the adapter within the hole.

FIG. 4 is an end view along axis LA, toward the exterior of the end cap buttress 56 into which an adapter has been inserted. Along with FIG. 2, it illustrates how, when the adapter 30 is inserted into the end cap hole 24, the adapter can be rotated through angle A, about the axis LA of the adapter male end, from a maximum offset or angled position to a maximum vertical position. Adapter 30 is shown in vertical position in FIG. 4. The axes LA and LB are vertically aligned and end 32 is at its maximum elevation relative to the base of the end cap. In FIG. 2, the adapter is shown in an inclined position, and in phantom 30P in vertical position, respectively with water-delivering pipes 26P, 26. As best shown in FIG. 4, the maximum rotation position of the adapter, to the right, is limited by the engagement of molded ear 37 which projects outwardly from body 33. The ear 37 contacts ledge 36R of saddle 57 of the buttress. In FIG. 4, the left rotation maximum position is at angle A as measured from the plane where the adapter axes are vertically aligned. That limit position results from engagement of a molded indent 35 on the adapter with ledge 36L of the end cap buttress. The indent is functionally analogous to ear 37. Other configuration of cooperating molded features on the end cap and adapter may be used to accomplish the purposes of limiting rotation in each direction. When the adapter is rotated so elements 35 and 36L are in contact, the parallel axes LA and LB are vertically unaligned. They lie in an inclined plane, and the second end axis is higher than the first end. The elevation of axis LB and hole 32 at the second end is less than when the axes are vertically aligned, and greater than the elevation of the end cap hole 24 relative to the base of the end cap.

In an alternate embodiment of adapter, the male end may have molded external spline features or a non-circular shape, and the plastic around hole 24 may have mating features.

Figure 6:
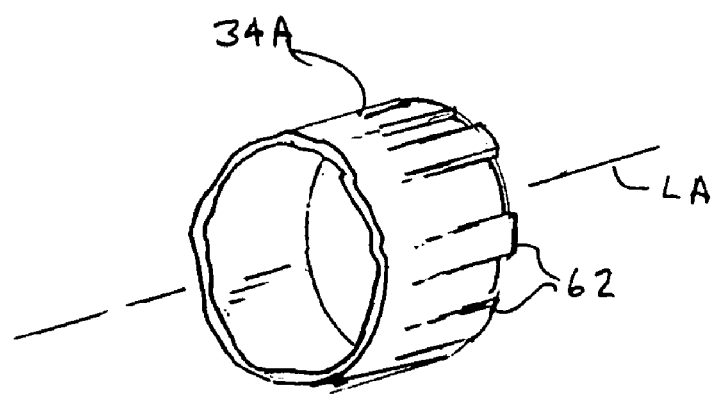
FIG. 6 is a partial isometric view of a splined first end of an adapter.

FIG. 6 is a fragmentary view of the first end 34A of an adapter having raised spline portions 62. In another embodiment, not shown, the exterior of the first end may have a polygon shape, e.g., a octagon, and the hole or port may have a mating configuration. With such non-circular exterior shapes, when the adapter is inserted into the hole at one of the selected angular orientations, the adapter will not rotate. In the generality of the invention, the means for limiting rotation is proximate the first end, and may be integral with the first end, as is the case with splines, or may be a projection or recess in the body of the adapter.

For molding and design reasons, the two stops described above, each limiting rotation in one direction are preferred. Other embodiments are within contemplation. One stop, for instance, limiting rotation when the axes are unaligned can be used. The installer can then judge when the axes are vertically aligned, for maximum invert height. Likewise, no stops can be used and the installer can use measuring devices or judgment, securing the adapter in position as desired with fasteners. In another embodiment, one protuberance on the adapter can engage two spaced apart features on the article, so rotation in both directions is limited.

Thus, in the preferred embodiment shown in the Figures, there are two positive positions for the adapter and three choices of water-delivery pipe invert elevation for an assembly of leaching chamber article and adapter, including the choice of not using the adapter. As an example, when used with a commercial Infiltrator® EQ36® leaching chamber (Infiltrator Systems, Inc., Old Saybrook, Conn.), having an end cap like that shown, angle A is about 40 degrees. When the adapter male end is inserted into the hole 24 of the end cap, and the adapter is rotated so that indent 35 and the ledge 36L engage, and the adapter is at its maximum inclined angle or offset. The pipe inserted into adapter female end hole 32, will have an invert elevation DIH of about 9 inch. When the adapter is rotated to its vertical position, where arm 37 engages the ledge 36R, the invert elevation DIH for a pipe is highest, at about 10 inch. When the adapter is not used, the invert elevation of a pipe fitted in hole 24 is about 8 inch. Thus, including the option of not using the adapter, the invert elevation for an end cap can be chosen positively to be 8, 9 or 10 inches. If desired, intermediate elevations between 9 and 11 inches can be selected by use of a fastener. Adapters which have different angular ranges, or which have different body lengths, to provide more or less range of elevation change are within contemplation. For example, the adapter and stops can be shaped so the axes cannot be made fully vertical; or so the axes can be made to lie in the horizontal plane.

Figure 5:
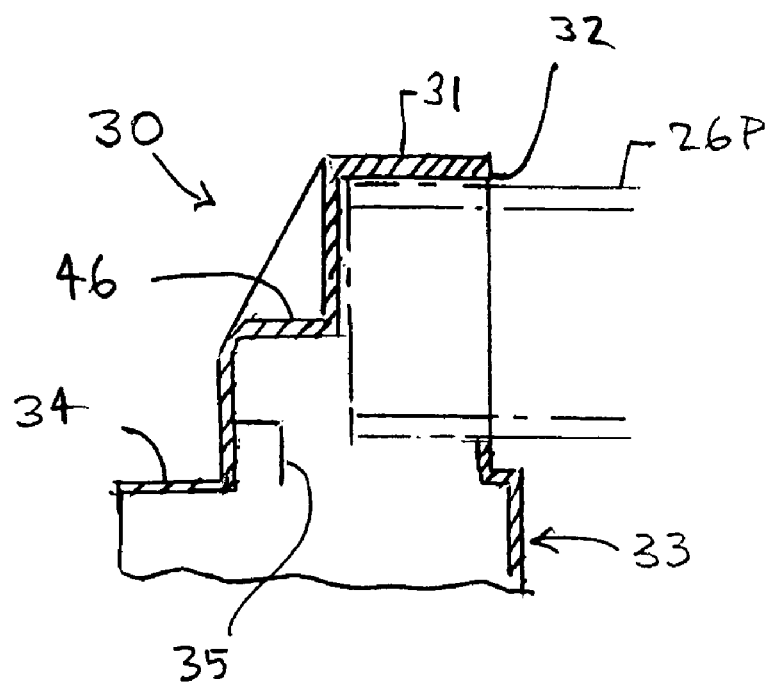
FIG. 5 is a partial vertical cross section through the inlet end of an adapter, and an inflow pipe, shown in phantom, in engagement with a interior stop.

The adapter 30 has another feature. As shown in FIG. 2 and the partial vertical center plane cross section of the adapter in FIG. 5, female end 31 has a buttress 46 which projects into the interior hollow of the adapter body, to limit the extent to which pipe 26 can move lengthwise into opening 32. In FIG. 5, phantom pipe 26B, is shown inserted into the opening 32 and in contact with molded buttress 46. The buttress acts as a stop, to keep pipe 26P a sufficient distance from the interior of body 33, to thus avoid inhibiting of water flow. Other molded features on the interior of the female end of the adapter, such as a multiplicity of inwardly projecting tabs, may be employed for the same stop-purpose.

In an alternative embodiment, the adapter may have greater overall axial length than described above. In particular, the adapter female end and or male end may extend lengthwise, so that the adapter has a nominal Z-shape when in place and viewed from the side.

In the invention, an adapter may have first and second ends which are respectively female and male, or which ends are the same. Such configuration may be suited to the devices and piping with which the adapter interconnects. For instance, the device to which the adapter connects may have a male port like a pipe stub, rather than a hole (female port). While the diameters of the first and second ends are preferably the same, i.e., so that male end of a first adapter will fit within the second female end of an identical second adapter, they may be dissimilar.

The adapter is preferably made by common molding, for instance injection molding, of a thermoplastic such as high density polyethylene or polypropylene. Other materials of construction may be employed.

While the adapter has by example been applied to use with an end cap, an adapter of the present invention may be used with any other device having a water-entry port above the elevation of the base. For example, the adapter may be connected to a buttress or fitting on the side or end of a leaching chamber, to another kind of chamber, to a distribution box or to an accessory for any of them. As further example, the adapter may be used with a leaching chamber and end plate of the type shown in U.S. Pat. No. 5,401,116 of Nichols et al.

The adapter of the present invention was conceived in connection with needs described in the Background, for use with water dispersing devices, in particular for providing a chosen invert elevation within a predetermined range. In special situations, the adapter may be used at the exit ends of such kinds of devices. The invention may be used with other fluid handling devices where analogous needs for changing the elevation of the inflow or outflow pipe are presented.

Although this invention has been shown and described with respect to one or more embodiments, it will be understood by those skilled in this art that various changes in form and detail thereof may be made without departing from the spirit and scope of the claimed invention.

We claim:

1. An adapter, for use with an article having a base and a water-entry port at an elevation which is spaced apart above the base, and for changing the invert elevation of a pipe which carries water to the article, wherein the article and adapter are suited for use with a subsurface leaching system which comprises:
    a first end, for connection to the elevated water-entry port of said article;
    an opposing second end, for connection to a water carrying pipe;
    a body having a hollow interior, for carrying water between the first end and the second end;
    the first and second ends having spaced apart and parallel major axes; wherein, when the first end is connected to said water-entry port, the first end is capable of being positioned in at least two different positions which are rotationally spaced apart about the first end major axis from each other, each different position having an associated different elevation of the second end major axis relative to the first end major axis; and,
    at least one means on the adapter proximate the first end, for limiting rotation of the adapter about said major axis in at least a first direction, when the first end is connected to a port of an article.

2. The adapter of claim 1 wherein the first end is circular, for fitting into a circular hole entry port of an article; and, wherein the first end fits within the second end of a like adapter.

3. The adapter of claim 2 wherein the means for limiting rotation is a protuberance on the exterior of the adapter.

4. The adapter of claim 1 wherein the means for limiting rotation is a non-circular shape exterior of the first end.

5. The adapter of claim 1 further comprising: second means, on the exterior of the body proximate the adapter first end, for limiting rotation of the body in direction opposite to the direction limited by a first means of said least one means.

6. The adapter of claim 1 further comprising: at least one protuberance on the exterior of the adapter first end, for engaging the periphery of a circular-hole shaped entry port of the article, and for inhibiting withdrawal of the adapter from the entry port.

7. The adapter of claim 3 further comprising at least one protuberance on the interior of the body near the second end, for limiting the extent to which a pipe is axially insertable into said second end.

8. An assembly for use in a subsurface leaching system, which comprises:
   a subsurface leaching system article having a base and a water-entry port at an elevation spaced apart from the base; and,
   an adapter, having a first end connected to the water-entry port of the article, an opposing second end for connection to a water carrying pipe, and a body having a hollow interior, for carrying water between the first end and the second end;
   the first and second ends of the adapter having spaced apart and parallel major axes; wherein, when the first end is connected to said water-entry port, the first end is capable of being positioned in at least two different positions which are rotationally spaced apart about the first end major axis from each other, to thereby change the elevation of the second end major axis with respect to the base; and,
   at least one means, on the adapter proximate the first end, for limiting rotation of the adapter, at least in a first direction, when the first end is connected to a port of a an article.

9. The assembly of claim 8 wherein the first end is male shaped and inserted into a female hole port of the article.

10. The assembly of claim 9 wherein the second end is female, for receiving a pipe; and, wherein the adapter first end fits within the second end of a like adapter.

11. The assembly of claim 8 wherein the article further comprises a buttress having a ledge proximate the entry port; and, wherein said means for limiting rotation of the adapter is a protuberance on the adapter body proximate the first end, for engaging said ledge.

12. The adapter of claim 8 wherein the means for limiting rotation is a non-circular shape exterior of the first end, wherein the article has a mating non-circular shape hole entry port.

13. The assembly of claim 8, wherein said at least one means on the adapter limits rotation of the adapter in a first rotational direction, to a point at which said major axes are vertically aligned; further comprising:
   second means on the adapter, for contacting a portion of the article and for thereby limiting rotation of the adapter in a second opposing rotational direction to a point at which the second end axis is vertically offset from and higher in elevation than the first end axis.

14. The assembly of claim 13 wherein the article further comprises a buttress having spaced apart ledge portions on either side of the entry port; wherein both means for limiting rotation contact said ledge portions, to thereby limit rotation as aforesaid.

15. The assembly of claim 9 wherein the entry port of the article is a hole, further comprising:
   at least one protuberance on the exterior of the adapter first end, for engaging the periphery of said hole, to inhibit withdrawal of the inserted adapter from the hole.

16. The assembly of claim 9 further comprising at least one protuberance within the hollow interior of the body near the second end, for limiting the extent to which a pipe is axially insertable into the second end.

17. The method of connecting a water-carrying pipe to a subsurface leaching system article having a base and a hole-port for water entry at an elevation spaced apart above the base, which comprises:
   inserting the first end of an adapter of claim 1 into the hole-port; and then selecting and carrying out the step of
   (a) rotating the adapter so said major axes are vertically aligned, to obtain a first invert elevation which is the maximum invert elevation achievable; or
   (b) rotating the adapter so said major axes are vertically offset, to obtain a second invert elevation which is less than said first invert elevation maximum but more than the elevation of the hole.

* * * * *